UNITED STATES PATENT OFFICE.

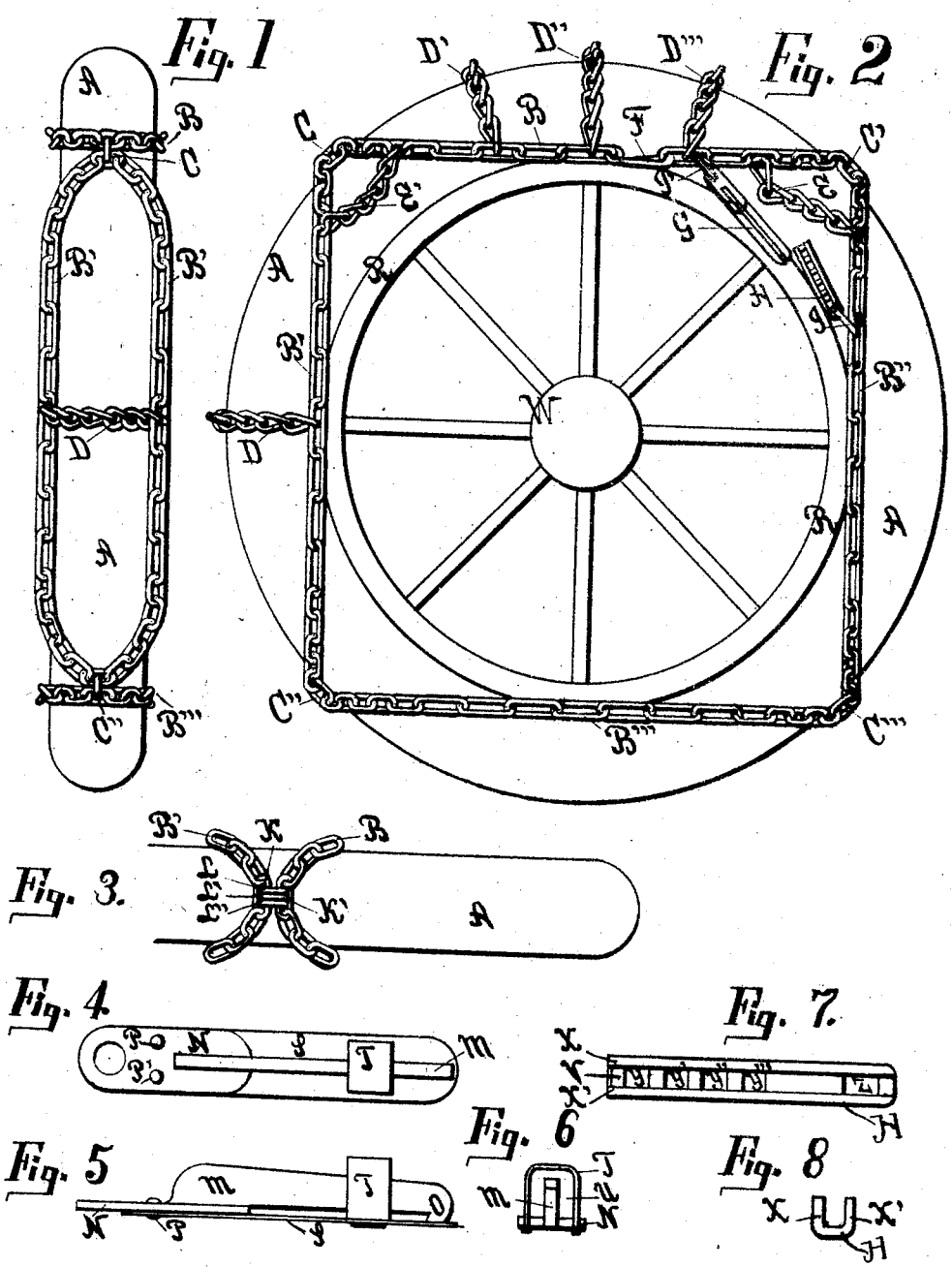

RICHARD A. BREUL, OF BRIDGEPORT, CONNECTICUT.

TIRE-GRIP.

1,043,062.  Specification of Letters Patent.  Patented Nov. 5, 1912.

Application filed June 20, 1912. Serial No. 704,725.

*To all whom it may concern:*

Be it known that I, RICHARD A. BREUL, a citizen of the United States, residing at Bridgeport, in the county of Fairfield and State of Connecticut, have invented a new and useful Tire-Grip for Use on Pneumatic Tires for the Purpose of Preventing the Sidewise Skidding of Such Vehicle-Tires. The following is a specification thereof.

There are now in use and patented two distinctive classes of such tire grips, one kind being securely fastened to the rim or spokes of the wheel, the other one being applied to the tire in such a manner as to be allowed to slip along and around the tire. My present invention is of this latter kind, and its object is to secure certain steps of positive and reliable advancement of the grip around the tire as against casual or voluntary and not dependable movements of so called creeping tire grips at present in use.

A further object of this invention is contained in the provision of a separate tightening device, after the grip has been secured to the tire, and furthermore the tread portion of my grip has been arranged in a manner to secure a large amount of gripping resistance in case of side skidding by the introduction of longitudinal or peripheral tread chains.

My invention consists in the novel construction and combination of parts as hereinafter described and explained, and defined in the appended claims.

Referring to the accompanying drawings as part of such description and specification, Figure 1 is an end elevation and Fig. 2 a side elevation of a wheel and tire, both figures showing the main construction of my invention, but only a number of auxiliary tread chains are in place, the rest being omitted. Fig. 3 shows a special manner of connecting the main divisions or loops of my grip. Figs. 4, 5 and 6 are side, top and end views respectively of a special spring hook engaged by a take-up and adjusting member illustrated in Figs. 7 and 8, the first being a plan view and the latter an end view thereof.

A tire A is secured to rim R of wheel W, as shown in Fig. 2. To tire A are secured four endless chain loops B, B′, B″ and B‴ which surround under tension corresponding quarter sections of the tire, such tension being maintained by the connection of these loops with each other at their nearest point of approach, which is on the outside or greatest periphery of the tire. The connection of the loops is preferably effected by links C, C′, C″, and C‴, engaging the nearest approaching chain links of adjoining loops.

One loop only, see B, Fig. 2, is separable and supplied on both sides of the tire with snap hooks F, of any suitable construction, for the purpose of attaching and of detaching the device from the tire. The grip is now secured to the tire and cannot come off while in use, but as creeping tire grips should preferably hug the tire tightly, and all slack thereof should be taken up, I have provided the additional adjusting device shown in Fig. 2, consisting of the parts G and H, shown disconnected in such drawing, and attached to certain side links of loops B and B″ by the links I and I′.

As will be seen, such device consists of the channel plate H and snap hook G, this latter one being further illustrated on an enlarged scale in Figs. 4, 5, and 6. It consists of base N, carrying hook part M. The flat spring S is secured to N by two rivets, P and P′, and bears well against hook nose O. The yoke T is riveted to spring S, allowing only sufficient movement thereof for the introduction of the channel shaped adjusting member H shown enlarged in Figs. 7 and 8. This part is bent from a plate to form base V and parallel sides X and X′. Hole Z is for the reception of a connecting link, and a number of apertures Y, Y′, Y″ and Y‴ are for the introduction of nose O of hook member G.

It will be seen, that the spring S, Fig. 4, will yield sufficiently to allow the channeled member to pass under and slide along nose O and into space U, Fig. 6, until sufficient tension of the grip is attained by drawing loops B and B″ toward each other. Nose O is then allowed to enter the nearest aperture, whereupon spring S will return to its normal position and the two tension adjusting members are held securely together thereby.

It will be observed that the channel shape of member H serves the double purpose of securely and readily guiding the two members while being adjusted, and also holds them together thereafter, so that no strain or accident may dislocate them or shift their proper relative position toward each other.

The description of the main structure and mode of application of my invention being now completed I have yet to allude to the tread chain portion of my device.

The endless chain loops B, B', B" and B'" have parallel sides connected by and continuing in oval shaped end connections passing diagonally along and across the outer periphery of the tire. These loop end ovals, together with their connecting links C, C', C" and C'", while being component portions of the main structure, also serve in the capacity of tread chains, very effectively covering, by reason of their diagonal disposition, four good portions of the tire. Being partly for such use, these oval loop portions are preferably constructed of short chain links, while the links of the straight side portion of these chain loops may be composed of much longer links. To further increase the serviceability of these tread chains just described, the loosely hanging chains E and E' are applied between all the loops as indicated in Fig. 2. These chains E, E', etc. are located outside the mean diameter and along the outer portion of the tire and come into contact with the pavement and action only when the vehicle commences to skid and when the contact portion of the tire is thereby thrown to one side of the wheel. Thus, when most needed, and at every quarter revolution of the wheel, these looping peripheral tread chains drag on and grip to the pavement and effectively prevent further skidding. It is important that these peripherally located tread chains should be so long as to hang loosely in place, so that they may not interfere with the central location of the series of loops. Other tread chains, such as D', D" and D'", Fig. 2, and shown attached to both sides of loop B may be applied to all the loops of this grip.

The action of the principal tread chains and the manipulation of the tensional adjusting device having been described, I will now explain the positive periodical shifting action of my grip along the periphery of the tire.

As the connected loop ends strike and pass the pavement, the portions of the pneumatic tire covered by them become flattened, while sustaining the weight of the vehicle, and thereby the chains in these connections become somewhat slackened. There being a continuous strain on the tire grip reverse to the direction of the turning wheel, by reason of its inertia, and as the greater amount of slack chain is thrown forward, a slight backward movement of the entire grip occurs at every quarter turn of the wheel. It must be observed that the tensional strain of the grip, acting on the tread chains composed of the loop ends, is the main factor in effecting this steplike advancement of my improved device.

Fig. 3 illustrates a top view of the connected end bows of two loops, another form of end connection being employed therein however, as three connecting links, L, L' and L", are used in place of one only, and the centrally located links K and K' of the bows of loops B and B' are of necessity somewhat longer than the other links of these end ovals.

While the employment of four loops for the construction of my device appears to be preferable, three or five or more such loops may form the component parts of my present grip without departing from the spirit of my invention.

Having thus described my improvement, I claim:—

1. A tire grip formed of endwise connected, elliptical chain loops, each one inclosing a segmental portion of the tire and forming a complete chord line of such segment along both tire sides and across the periphery thereof, one such loop containing a separating attachment on each tire side, and means attached to the side portions of two adjoining loops for obtaining, and to adjust, tension to such tire grip.

2. A tire grip consisting of a sequence of endless chains formed into elliptical loops, adjoining ones being connected together by centrally located attaching links engaging the links situated in the apices of such loops, detachable hooks being contained in the sides of one loop, and peripherally situated, slack tread chains being attached to the end ovals of adjoining loops.

3. A tire grip-tread chain arrangement, consisting of a cross formation having a central connection, in combination with slack hanging, longitudinally disposed tread chains, held by and suspended between such cross forming chains and situated along the outer surface of both tire sides.

4. A tire grip composed of four chain loops inclosing four quarter segments of a tire, such loops being connected by links resting on the outer periphery of the tire, attachments on one loop for the disconnection of the device, and transverse tread chains attached to the parallel portions of the loop sides.

RICHARD A. BREUL.

Witnesses:
EDWARD F. MARVIN,
B. F. PIKE.

Copies of this patent may be obtained for five cents each, by addressing the "Commissioner of Patents, Washington, D. C."